Jan. 10, 1961 N. C. JAMISON 2,967,984

SEMICONDUCTOR DEVICE

Filed Nov. 3, 1958

INVENTOR.
N. C. JAMISON
BY
Frank R. Trifari
AGENT.

United States Patent Office 2,967,984

Patented Jan. 10, 1961

2,967,984

SEMICONDUCTOR DEVICE

Noel C. Jamison, Irvington, N.Y., assignor to North American Philips Company, Inc.

Filed Nov. 3, 1958, Ser. No. 771,310

11 Claims. (Cl. 317—234)

This invention relates to semiconductor devices and constructions for improving their heat dissipating abilities.

One of the important limitations which controls the limiting power level of operation of such devices is the temperature attained by the semiconductive crystal, because above certain temperatures, the semiconducting characteristics of the device degenerate. To increase the power output from such a device, steps must be taken to carry away the heat generated at the electrodes of the device at a sufficiently rapid rate to avoid the build-up of a temperature above this limit. One technique generally employed is to fill the housing with an insulating mass having a heat conductance exceeding that of air, other gases or vacuum, so that an improved thermal path is established between the source of the generated heat, which is generally in the crystal, and an external heat sink. However, such expedients have not provided a sufficient increase in heat dissipation.

The chief object of the invention is to provide a structure for increasing the conduction of heat from the semiconductive member to an external heat sink.

In accordance with the invention, this increase in heat conduction is obtained by mounting within the enclosure of the device a heat-conducting member. This heat-conducting member is preferably located close to the point of the device generating most of the heat. This heat-conducting member is in turn mechanically connected to a metallic part of the device enclosure so as to provide a direct path for heat flow thereto, and this metallic part of the enclosure is in turn mounted in contact with a suitable heat sink.

In accordance with another feature of the invention, the interior of the enclosure is filled with a mass of small metallic members embedded in an insulating mass so that the metallic members are electrically insulated from the electrode structure of the device. These metal members form a highly conductive thermal path from the electrode structure to a metallic part of the enclosure, which is in turn mounted on a suitable heat sink.

It has been found that the above constructions of the invention, either alone or combined, have sharply reduced the temperature rise at the crystal to a much greater extent than was possible with the prior art constructions, with the consequence that such devices are capable of operation at much higher power levels without changing the geometry of the electrode structure or its size.

The invention will now be described in greater detail with reference to the accompanying drawing, in which.

Figure 1:
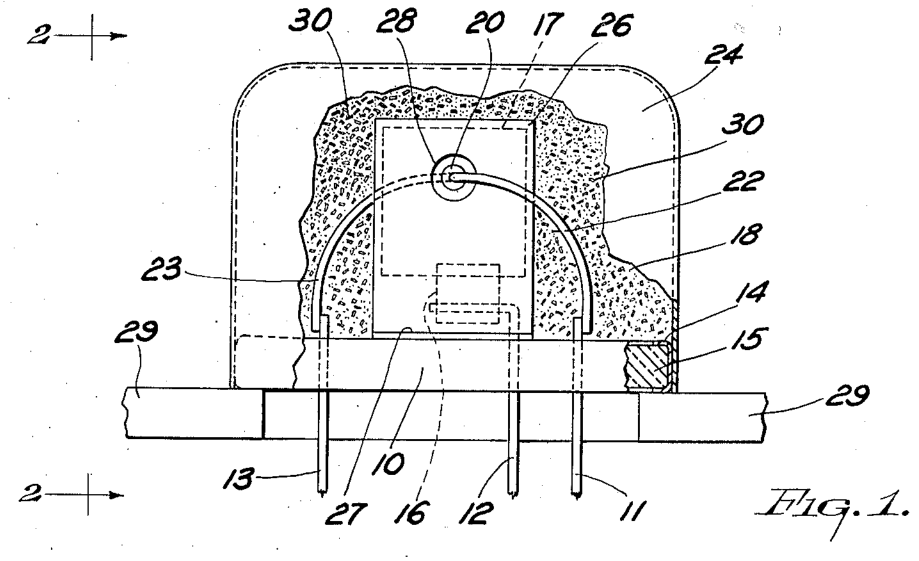
Fig. 1 is an elevational view of a semiconductor device of the invention shown mounted in position on a chassis and with part of the enclosure cut away to show the interior.
Figures 2, 3A, 3B:
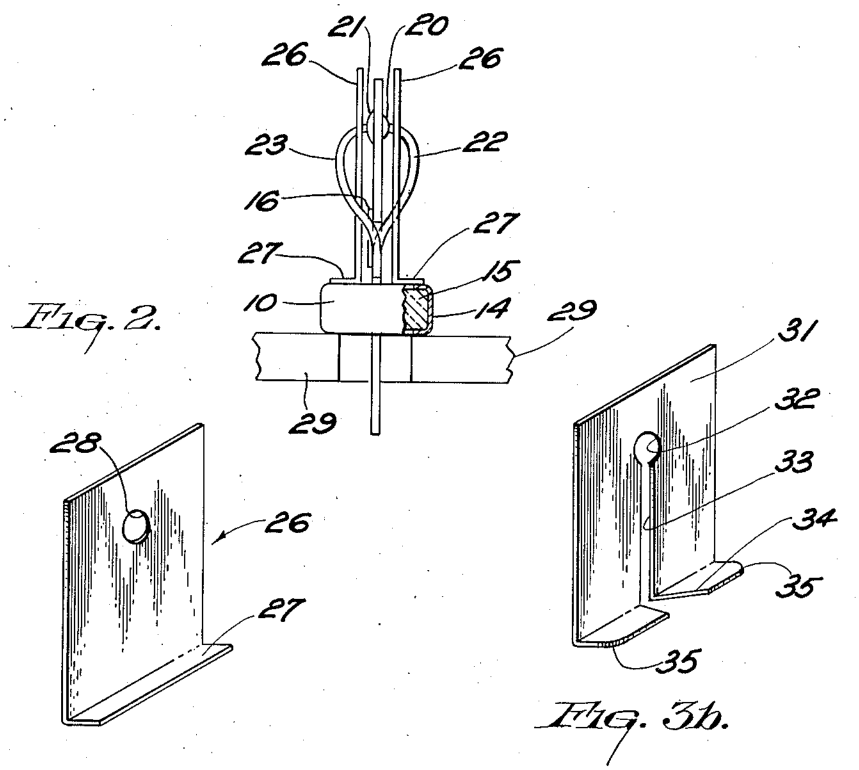
Fig. 2 is a side view of the device of Fig. 1 with the enclosure removed.

Fig. 3*a* is a perspective view of a heat-dissipating plate employed in the construction illustrated in Fig. 1;

Fig. 3*b* is a perspective view of a modification of the plate illustrated in Fig. 3*a*.

Referring now to Figs. 1 and 2 of the drawing, there is shown therein a transistor comprising the heat-dissipating structure of the invention, though it will be appreciated that the invention can also be employed with other semiconductor devices, such as diodes. The transistor shown comprises an oval-shaped header 10 supporting in insulated fashion three lead-in pins 11, 12 and 13 representing the terminal connections for the emitter, base and collector electrodes, respectively, of the transistor. As is conventional, the spacing between the emitter and base lead-ins is smaller than the spacing between the collector and base lead-ins. The header 10 itself, as is also quite conventional and has been shown in cross-section at an edge, is a metal ring 14 within which is sealed a vitreous substance 15, such as glass, serving to insulate the lead-in pins from one another.

The central pin 12 is bent over at right angles and to it is welded at one end a base tab 16, the other end of which is soldered to a semiconductive crystal 17, which has the shape of a thin, rectangular wafer and which may be of the usual semiconductive materials of the elemental type, such as germanium or silicon, or of the compound type, such as aluminum antimonide, gallium arsenide, etc. As will be evident, the plane of the crystal 17 lies in the longitudinal direction of the oval-shaped header 10. At the opposite large surfaces of the crystal 17 are fused alloying pellets 20 and 21 for producing the emitter and collector electrodes, respectively. To each of these pellets is in turn soldered a connecting wire, referred to by numerals 22 and 23, connecting the pellets to their associated terminal pins 11 and 13. Enclosing the structure is a metal can 24 which is cold-welded at its bottom edge to the metal ring 14 of the header to form a vacuum-tight seal. Before sealing of the device, the interior is generally filled with a silicone or like grease 18 to protect the sensitive semiconductor structure from contamination and also to provide improved heat dissipation. The structure so described is the conventional alloy junction transistor well-known in the art.

It was found by the applicant that the structure above-described was unable to handle even moderate amounts of power as is often required in many applications. It was further found that the primary obstacle to the transfer of heat generated at the electrodes to a heat sink external to the device was the poorly conductive heat path between the electrodes or electrode-forming pellets and a metal part of the enclosure which could be maintained in good thermal association with the heat sink. The structure of the invention overcomes this drawback by providing adjacent to the crystal and its alloyed pellets and as closely spaced thereto as possible a massive member capable of conducting heat at a relatively high rate and mounted on a heat conducting portion of the enclosure close to the external heat sink. In its preferred form, this heat-dissipating structure comprises a pair of L-shaped metal plates 26 whose lower horizontal portions 27 are soldered to the portion of the metal ring 14 of the header 10 that overlaps the glass insulator 15 so that a good heat conducting path exists between the plates 26 and the metal ring 14. The upper portions of these L-shaped plates 26 extend in a plane parallel to the plane of the crystal wafer 17 and spaced and insulated therefrom though as closely spaced as possible thereto so that the path through the silicone grease 18 representing the point of most resistance in the heat-conducting circuit is minimized. To enable the connectors 22 and 23 to reach their associated pellets 20 and 21, apertures 28 are provided in each of the plates. As the structure described enables the heat generated at the electrodes to be carried readily through the heat-dissipating plates 26 to the metal ring 14 of the header 10, it is essential that the transistor be mounted with this metal ring 14 in contact with a suitable heat sink. This is easily attained by mounting the transistor on the usual metal chassis 29 or similar massive metal member. Hence, the chassis, which represents an inexhaustible absorber of heat, is maintained in satisfactory thermal-conducting relationship with the heat-dissipating plates 26.

The shape or dimensions of the heat dissipating plates 26 are not critical. The only requirements are that they be a relatively massive, good heat dissipating member, such as metal, with a relatively large surface area so that heat is absorbed through a large solid angle. Highly conducting metals as silver or copper are preferred. Moreover, it should be spaced as closely as possible to the points or areas of the semiconductor structure which represent the main generators of the heat. In most cases, this is the collector electrode of the transistor. Thus, satisfactory results will be obtained with only a single heat-dissipating plate adjacent the collector. Finally, it should be mechanically secured to a portion of the transistor which is itself in good thermal conducting relationship with a suitable heat sink. Good results have been obtained with 10 mil thick silver plates spaced about 10 mils from the crystal wafer. The shape of the plates is in general determined by the manner in which the device is fabricated and the shape of its header. As will be evident from the foregoing description, the construction of the plate illustrated in Fig. 3*a*, which is a perspective view of the plates employed in the device of Figs. 1 and 2, requires that the plates 26 be assembled before connections are made to the emitter and collector pellets. If, on the other hand, it is preferred to make the connections first, and thereafter assemble the plates in position, this can be readily accomplished by providing a slot along the bottom of the plate for passage of the connection as the plate is placed in position. This is illustrated in Fig. 3*b*, in which the plate 31 contains an aperture 32 at its upper surface for passage of the connector. The connector also contains a slot 33 communicating with the aperture passing downward to the horizontal portion of the plate and from thence running to the edge. The structure of the plate in Fig. 3*b* may also be used in a device with a circular-shaped header, which means then that an opening may be needed in the horizontal portion for passage of the emitter or collector pins. This has been provided in the bottom portion of the plate 31 by providing the slot 33 with an outwardly tapered portion 34. Further, the edges 35 of the plate are rounded to match the shape of the header. It will also be evident that an L-shaped configuration is not essential but that other bends may be provided so that the plate remains clear of other electrodes and terminals within the envelope.

While the structure above-described has provided a significant improvement in the power capable of being dissipated from such devices, it was further found that even a short poorly-conducting path between the plate and the semiconductor structure represented a limit on the power that could be handled by such devices. A further improvement is possible by interposing in the silicone grease 18 a host of finely-divided metallic particles 30 in amounts such that these particles form an almost continuous conducting path between the points or areas of the device generating the heat and a portion of the device in good thermal association with a suitable heat sink. It was further found that especially suitable for this purpose are tiny aluminum rods, with a length of about 15 to 30 mils and a diameter of about 4 mils, which are intimately mixed with a silicone or like grease and packed into the can such as by centrifuging, with the electrode structure inserted into this mass of aluminum rods and grease so that the rods and grease completely surround and contract all of the semiconductive wafer and its electrodes and associated connections. This has only been shown schematically in Fig. 1 to keep the illustration clear. In actual fact, these tiny rods 30 completely surround all the wafer 17 and lie between the wafer and the adjacent dissipating plates 26 as well as between the plates 26 and the outer can 24. Thus, not only is the thermal path to the heat-dissipating plates improved, but also a low impedance path for heat flow is formed to the metal can, which is able to dissipate heat by its mechanical connection to the ring 14 of the header and also by radiation and convection to the surrounding evironment.

One of the unexpected results of the invention is that metal rods with all their good thermal properties may be employed without causing unwanted short circuits of the device. This is a consequence of the silicone or like grease forming a very thin insulating layer over the whole surface of the rod, which effectively electrically insulates each of them from each other as well as from the electrode structure of the device. Thus, no special efforts are required to insulate the electrode structure from these metal rods. Further, the rod shape, which may have a circular or rectangular cross-section, of these heat conducting particles has been found to provide better heat conduction than had the particles a spherical shape, so that the rod shape is preferred in the invention. It will also be appreciated that the two heat-dissipating expedients described may be used alone or in combination, and that each functions independently to provide its own improvement over the heretofore known structures and that in combination they produce still a further improvement in heat dissipation. Experiments have shown that in two identical devices, except for the presence in one of the heat-dissipating plates 26, the junction temperature rise per milliwatt of power output, which is a measure of the heat-dissipating ability of the device, was reduced from 0.26° C. to 0.14° C. in the inventive construction. Similar results were found when employing a mass of aluminum rod-like pellets embedded in a silicone grease alone in a metal enclosure. The combination of heat-dissipating plate and mass of metal pellets embedded in an insulating mass produces even a further improvement than that just described.

The proportions of the rod-like pellets and their embedding grease are not critical. It is preferred to use as many pellets as possible provided that sufficient grease exists to coat each with an insulating sheath. Satisfactory results have been achieved with a mixture of about ¼ gram of cut aluminum wire of 13 mils diameter and about 30 mils long in about ½ gram of Dow-Corning No. 4 silicone grease compound. Also, any good heat-conducting material can be used in place of the aluminum. The length of the rods should exceed their diameter, and the length should be chosen to be substantially less than the spacing between the elements between which the improved thermal path is being established by the presence of the rods. The rods thus become randomly oriented in the grease and form many high heat conducting paths to the nearest massive metal member. Centrifuging the device packs the rods more at the top end of the can than near the header, so they become concentrated at the electrodes. It will be appreciated that for the rod dimensions indicated above, the spacing between the elements between which the improved thermal path is established should naturally exceed 30 mils. For the 10 mil spacing described in connection with Fig. 1, the rod lengths should naturally be, as above described, substantially smaller than 10 mils to achieve the desired random orientation of the rods.

While I have described my invention in connection with specific embodiments and applications, other modifications thereof will be readily apparent to those skilled in this art without departing from the spirit and scope of the invention as defined in the appended claims.

What is claimed is:

1. A semiconductor device comprising an envelope having a good heat-conducting portion, a semiconductive member mounted within said envelope, electrode connections to said semiconductive member, a metal, heat-dissipating member connected to the good heat-conducting portion of the envelope and extending within the envelope to an area closely spaced from a heat generating portion of the semiconductive member and its electrode connections, and a mass of metal particles having an insulating coating interposed between the semiconductive member and its electrodes, and the heat-dissipating member to shorten the path for heat flow thereto.

2. A semiconductor device comprising an envelope having a metal portion, a semiconductive member mounted within said envelope, electrode connections to said semiconductive member, an electrically insulating and thermally conducting fill in the envelope and surrounding the semi-conductive member and its electrode connections, and a metal, heat-dissipating member connected to the metal portion of the envelope and extending within the envelope and within the fill to an area closely spaced to but mechanically separated from a heat generating portion of the semiconductive member and its electrode connections to shorten the path for heat flow therefrom.

3. A device as set forth in claim 2 wherein the semiconductive member is a wafer, and the heat-dissipating member comprises a plate-like member extending parallel to the plane of the wafer.

4. A device as set forth in claim 3 wherein the plate-like member has an aperture for passage of a connection to the electrodes.

5. A semiconductor device comprising an envelope having a metal portion, a semiconductive member mounted within said envelope, electrode connections to said semiconductive member, and electrically insulating and thermally conductive grease-like fill in the envelope and surrounding the semi-conductive member and its electrode connections, a metal, heat-dissipating member connected to the metal portion of the envelope and extending within the fill and the envelope to an area closely spaced to but mechanically separated from an electrode tending to generate large amonts of heat, and a heat sink in good thermal relationship with said metal portion of the envelope.

6. A device as set forth in claim 5 wherein the heat-dissipating member is generally L-shaped.

7. A device as set forth in claim 6 wherein the heat-dissipating member contains a slot running along its length for accommodating connections within the envelope.

8. A device as set forth in claim 5 wherein the heat-dissipating member is mounted on a metallized base portion of the envelope.

9. A semiconductor device comprising an envelope having a metal portion, a semiconductive member mounted within said envelope, electrode connections to said semiconductive member, and a mass of metal rods each having an insulating coating interposed between the semiconductive member and its electrodes, and the metal portion of the envelope to shorten the path for heat flow thereto but providing electrical insulation therebetween.

10. A device as set forth in claim 9 wherein the rods have a greater length than width and are embedded in insulating grease.

11. A device as set forth in claim 10 wherein the rods are of aluminum.

References Cited in the file of this patent

UNITED STATES PATENTS

| | | |
|---|---|---|
| 2,809,332 | Sherwood | Oct. 8, 1957 |
| 2,810,873 | Knott | Oct. 22, 1957 |
| 2,825,014 | Willemse | Feb. 25, 1958 |